US012597558B2

(12) United States Patent
Montenegro et al.

(10) Patent No.: US 12,597,558 B2
(45) Date of Patent: Apr. 7, 2026

(54) SPIRAL CORE CURRENT TRANSFORMER FOR ENERGY HARVESTING APPLICATIONS

(71) Applicant: S&C Electric Company, Chicago, IL (US)

(72) Inventors: Alejandro Montenegro, Chicago, IL (US); Raphael Guio, Barrington, IL (US); Claire Schauble, Chicago, IL (US)

(73) Assignee: S&C Electric Company., Chicago, IL (US)

(*) Notice: Subject to any disclaimer, the term of this patent is extended or adjusted under 35 U.S.C. 154(b) by 0 days.

(21) Appl. No.: 18/318,930

(22) Filed: May 17, 2023

(65) Prior Publication Data

US 2023/0307177 A1 Sep. 28, 2023

Related U.S. Application Data

(62) Division of application No. 16/556,319, filed on Aug. 30, 2019, now Pat. No. 11,657,959.

(Continued)

(51) Int. Cl.

*H01F 41/02* (2006.01)
*H01F 27/06* (2006.01)

(Continued)

(52) U.S. Cl.

CPC ........... *H01F 41/022* (2013.01); *H01F 27/06* (2013.01); *H01F 41/079* (2016.01);

(Continued)

(58) Field of Classification Search

CPC .... H01F 41/022; H01F 41/079; H01F 41/061; H01F 41/074; H01F 41/125; H01F 27/06;

(Continued)

(56) References Cited

U.S. PATENT DOCUMENTS

| | | |
|---|---|---|
| 3,171,607 A | 3/1965 | Moore |
| 4,765,861 A | 8/1988 | Curtis, Jr. et al. |

(Continued)

FOREIGN PATENT DOCUMENTS

| | | | |
|---|---|---|---|
| JP | 2010-45375 A | | 2/2010 |
| JP | 2010045375 A | * | 2/2010 |

OTHER PUBLICATIONS

Roesler et al., "Planar LTCC Transformers for High-Voltage Flyback Converters," in IEEE Transactions on Components and Packaging Technologies, vol. 33, No. 2, pp. 359-372, Jun. 2010. (Year: 2010).*

(Continued)

*Primary Examiner* — A. Dexter Tugbang

(57) ABSTRACT

A current transformer assembly for harvesting power from a primary conductor, such as a power line, for operating electronics, where the assembly is secured to the conductor while the conductor is connected. The assembly includes a current transformer having a transformer structure with a central opening that accepts the primary conductor and a spindle member for accepting a current transformer magnetic tape operating as the core of the current transformer. The assembly also includes a tape carrier secured to the structure on which the transformer tape is wound, and a winding device operable to unwind the transformer tape from the tape carrier and wind the tape onto the spindle member.

2 Claims, 8 Drawing Sheets

Related U.S. Application Data

(60) Provisional application No. 62/725,322, filed on Aug. 31, 2018.

(51) Int. Cl.

| | |
|---|---|
| ***H01F 41/079*** | (2016.01) |
| ***H01F 41/12*** | (2006.01) |
| *H01F 27/04* | (2006.01) |
| *H01F 27/32* | (2006.01) |
| *H01F 41/061* | (2016.01) |
| *H01F 41/074* | (2016.01) |

(52) U.S. Cl.

CPC ........... *H01F 41/125* (2013.01); *H01F 27/04* (2013.01); *H01F 27/325* (2013.01); *H01F 41/061* (2016.01); *H01F 41/074* (2016.01); *Y10T 29/4902* (2015.01); *Y10T 29/49071* (2015.01); *Y10T 29/49073* (2015.01)

(58) Field of Classification Search

CPC .... H01F 27/04; H01F 27/325; Y10T 29/4902; Y10T 29/49071; Y10T 29/49073

See application file for complete search history.

(56) References Cited

U.S. PATENT DOCUMENTS

| | | | | |
|---|---|---|---|---|
| 6,221,297 | B1 * | 4/2001 | Lanoue | H01F 41/061 29/605 |
| 7,271,696 | B2 | 9/2007 | Piaskowski | |
| 2009/0009274 | A1 | 1/2009 | Horstmann | |
| 2009/0278647 | A1 | 11/2009 | Buswell | |
| 2010/0084920 | A1 | 4/2010 | Banting et al. | |

OTHER PUBLICATIONS

International Search Report and Written Opinion dated Nov. 15, 2019, for the International Patent Application No. PCT/US2019/048952. (9 pages).

* cited by examiner

SPIRAL CORE CURRENT TRANSFORMER FOR ENERGY HARVESTING APPLICATIONS

CROSS-REFERENCE TO RELATED APPLICATIONS

This application is a divisional application of U.S. application Ser. No. 16/556,319 filed on Aug. 30, 2019, which claims the benefit of the filing date of provisional patent application Ser. No. 62/725,322, titled, Spiral Core Current Transformer For Energy Harvesting Applications, filed Aug. 31, 2018.

BACKGROUND

Field

The present disclosure relates generally to a current transformer assembly having a wound spiral core and, more particularly, to a current transformer assembly having a wound spiral core that is attachable to a connected power line.

Discussion of the Related Art

An electrical power network, often referred to as an electrical grid, typically includes a number of power generation plants each having a number of power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to a number of substations typically located within a community, where the voltage is stepped down to a medium voltage for distribution. The substations provide the medium voltage power to a number of three-phase feeders including three single-phase feeder lines that carry the same current, but are 120° apart in phase. A number of three-phase and single phase lateral lines are tapped off of the feeder that provide the medium voltage to various distribution transformers, where the voltage is stepped down to a low voltage and is provided to a number of loads, such as homes, businesses, etc.

It is known in the art to couple monitoring devices to the various feeder lines and lateral lines in an electrical power network to monitor current, voltage, power factures, temperature, etc. in the line so as to detect faults downstream of the device, which can be used to identify fault locations, help with protection schemes and perform load profiling. The monitoring devices typically employ current transformers having a secondary winding wound on a core that generates a current flow by magnetic induction coupling with the current traveling in the power line. This current flow is used to power the sensors and other electronics in the device, such as transmitters that wirelessly transmit the measurement signals to a control facility.

The current transformers include a central opening through which the power line travels. Thus, the power line needs to be positioned in the opening when the monitoring device is installed. However, it is costly, disruptive and impractical to disconnect the power line to pass the line through the opening. Therefore, split core current transformers are generally employed in these types of monitoring devices that have an air gap in the core of the transformer that allows the power line to be inserted into the core opening while it is connected. Once the power line is positioned within the core, a lineman will employ a hot stick to rotate a threaded engagement or other attachment device to close the core around the power line where it is securely fixed. However, because the current transformer has a split core with an air gap therein, the magnetic field lines traveling through the core when the transformer is carrying current are disrupted, which reduces the amount of power that is generated for powering electronics in the device. Therefore, because the split core transformer is only able to generate a reduced amount of power when compared to a solid core based on its size, the number and type of electronics within the device is also limited.

SUMMARY

The present disclosure describes a current transformer assembly for harvesting power from a primary conductor, such as a power line, for operating electronics, where the assembly is coupled to the conductor. The assembly includes a current transformer having a transformer structure with a central opening that accepts the primary conductor and a spindle member for accepting a current transformer including a lamination in a spiral shape form, such as a magnetic tape, operating as the core of the current transformer. The assembly also includes a tape carrier secured to the structure on which the transformer tape is wound, and a winding device operable to unwind the transformer magnetic tape from the tape carrier and wind the magnetic tape onto the spindle member.

Additional features of the present disclosure will become apparent from the following description and appended claims, taken in conjunction with the accompanying drawings.

DETAILED DESCRIPTION OF THE EMBODIMENTS

The following discussion of the embodiments of the disclosure directed to a current transformer assembly including a current transformer having a wound spiral core and being attachable to a connected power line is merely exemplary in nature, and is in no way intended to limit the disclosure or its applications or uses. For example, the discussion below describes the current transformer assembly as being installed on a power line without opening or de-energizing the line. However, as will be appreciated by those skilled in the art, the current transformer assembly of the disclosure may have other applications and uses.

Figure 1:
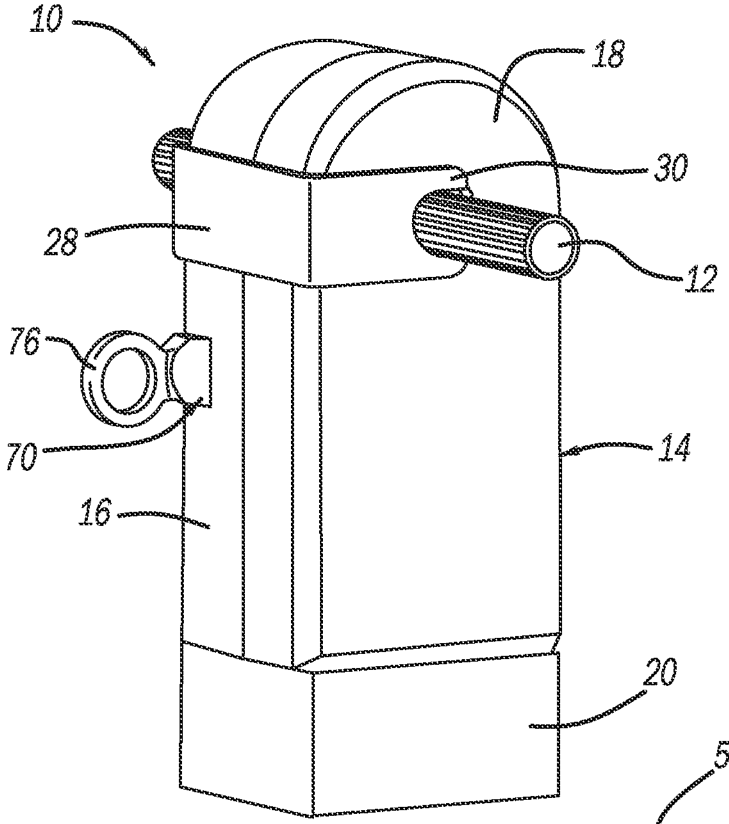
FIG. 1 is an isometric view of a current transformer assembly including a current transformer having a wound spiral core, where a power line travels through the transformer.
Figure 2:
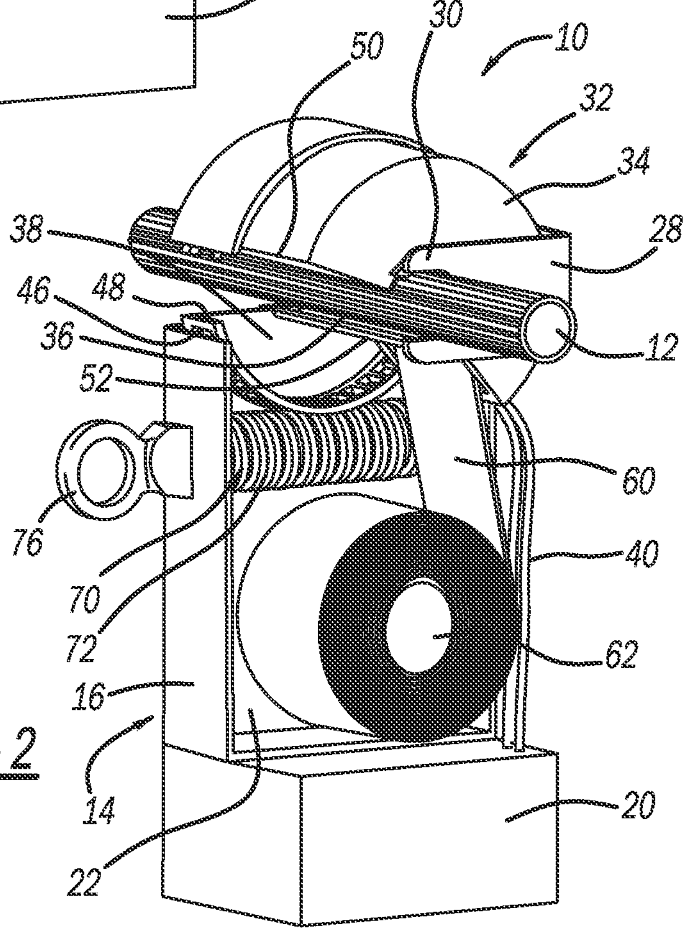
FIG. 2 is a broken-away isometric view of the current transformer assembly showing a spiral core lamination wound on a spindle.
Figure 3:
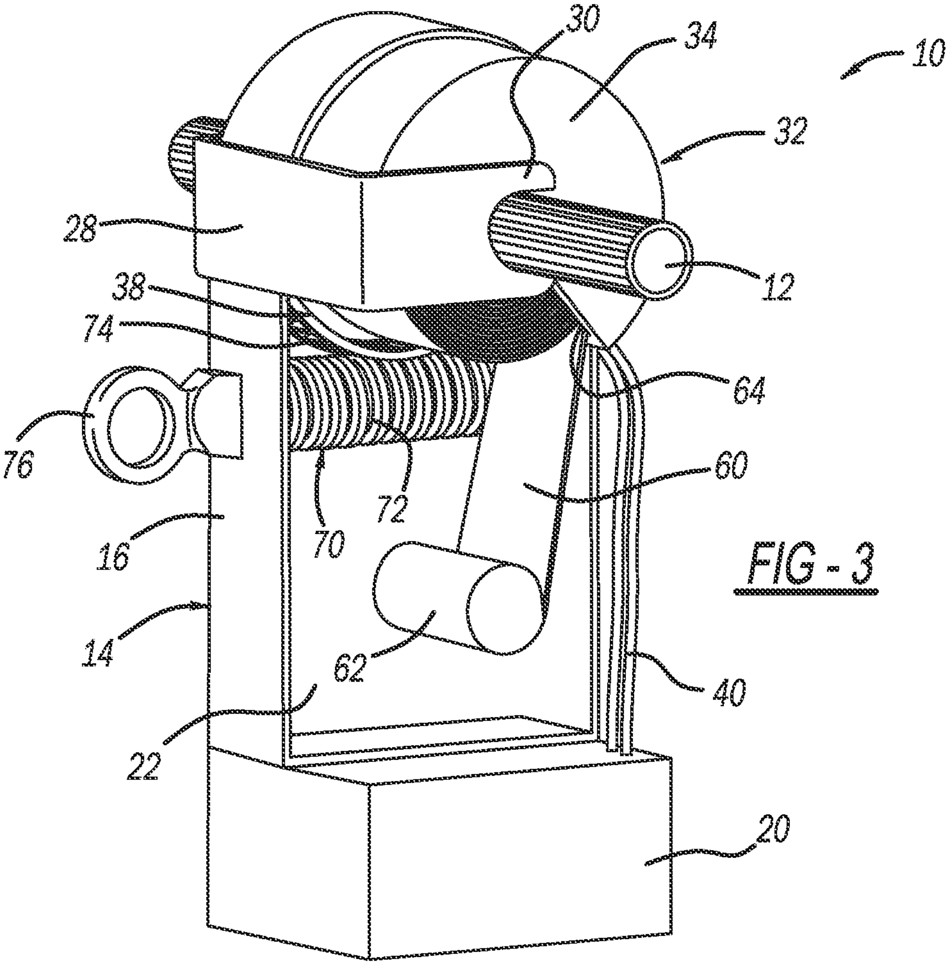
FIG. 3 is a broken-away isometric view of the current transformer assembly showing the spiral core lamination wound around the power line.

FIG. 1 is an isometric view of a current transformer assembly 10 that is applicable to be installed on an electrical power line 12, such as a power line in an electrical power network. The power line 12 is intended to represent any of the several types of power lines employed in electrical power networks, such as transmission lines, feeder lines, lateral lines, etc., which carry varying amounts of current and power, including high current. The assembly 10 includes an outer housing 14 mounted to a control box 20, where the housing 14 includes a back housing panel 16 and a front housing panel 18 defining an enclosure 22. The assembly 10 also includes a bracket 28 pivotally secured to the outer housing 14 that has cut-out sections 30 that accept the line 12 for securing the line 12 to the assembly 10. FIGS. 2 and 3 are isometric views of the assembly 10 with the front panel 18 removed to show the components therein, as described below.

The current transformer assembly 10 further includes a current transformer 32 having a secondary winding 34 and an open tube 36 extending across the center of the secondary winding 34 through which the power line 12 extends, where the tube 36 is rotatable within the secondary winding 34, and where the line 12 is the primary conductor for the transformer 32. Wires 40 are part of the secondary winding 34 and extend into the control box 20 to provide power to electronics therein. The tube 36 is rigidly secured to a circular plate 38 that is rotatably mounted within the housing 14 so that the tube 36 and the plate 48 rotate in combination. The outer housing 14 includes a slot 46, the plate 38 includes a slot 48, the secondary winding 34 includes an opening 50 and the tube 36 includes a slot 52 that all align with each other so as to allow the line 12 to be inserted into the tube 36 without disconnecting it. The bracket 28 is pivotally mounted to the housing 14 so that it can be positioned in an open position to expose the slots 46, 48 and 52 to accept the line 12, as shown in FIG. 2, and a closed position to cover the slots 46, 48 and 52 and hold the line 12 in the tube 36, as shown in FIG. 3.

A ferromagnetic lamination 60 made of a transformer core material having a high magnetic permeability, such as a suitable steel, having a certain thickness and length suitable for the size of the current transformer 32 is wound on a spindle 62 rigidly secured in the outer housing 14, where one end of the lamination 60 is secured to the spindle 62. The lamination 60 extends into a secondary winding opening 64, where an opposite end of the lamination 60 is secured to the tube 36. The assembly 10 is shown in this configuration in FIG. 2.

The current transformer assembly 10 includes a cylindrical winding device 70 that extends across the enclosure 22, as shown, and that has gear teeth 72 that engage plate teeth 74 that are circumferentially disposed around the plate 38. By rotating the device 70 using a key 76, for example, through a special tool used by the lineman, the engagement of the teeth 72 and 74 causes the plate 38 and the tube 36 to rotate, which pulls on the lamination 60 and causes it to unwind from the spindle 62 and be wound onto the tube 36 to form the core of the transformer 32. The assembly 10 is shown in this configuration in FIG. 3.

Figure 4:
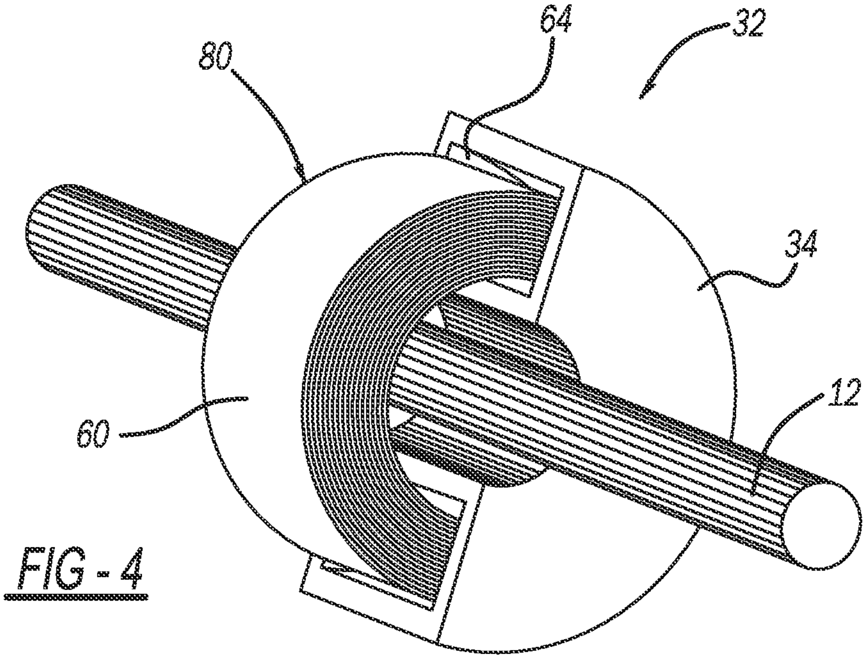
FIG. 4 is a cut-away isometric view of the current transformer separated in the assembly shown in FIG. 1.

FIG. 4 is a broken-away, isometric view of the current transformer 32 separated from the current transformer assembly 10 showing the lamination 60 being wound within the secondary winding opening 64 to define a magnetic wound spiral core 80 having laminated layers. It is noted that the lamination 60 can be unwound from the tube 36 and wound onto the spindle 62 by turning the device 70 in an opposite direction in a similar manner.

The current transformer assembly 10 can include any suitable electronics provided in the control box 20 for any particular application that receive electrical power generated in the secondary winding 34 as a result of inductive coupling with the power line 12. Example electronics include, but are not limited to, a current sensor, a temperature sensor, processing circuitry, a humidity sensor, a wireless transceiver, etc.

Once the lamination 60 has been wound onto the tube 36 in the secondary winding opening 64, then the current transformer 32 is complete in that electrical current flowing in the power line 12 creates magnetic field lines in the wound core 80 that generate an electrical current in the secondary winding 34. The number of the windings of the lamination 60 within the secondary winding opening 64 that form the core 80 would be determined for the particular application. The wound core 80 increases the power transfer efficiency from the power line 12 to the secondary winding 34 because the direction of the magnetic flux is the same as the winding direction of the lamination 60 within the secondary winding opening 64. The wound core 80 also reduces losses due to Eddy currents because laminations are formed as the core 80 is wound.

Figure 5:
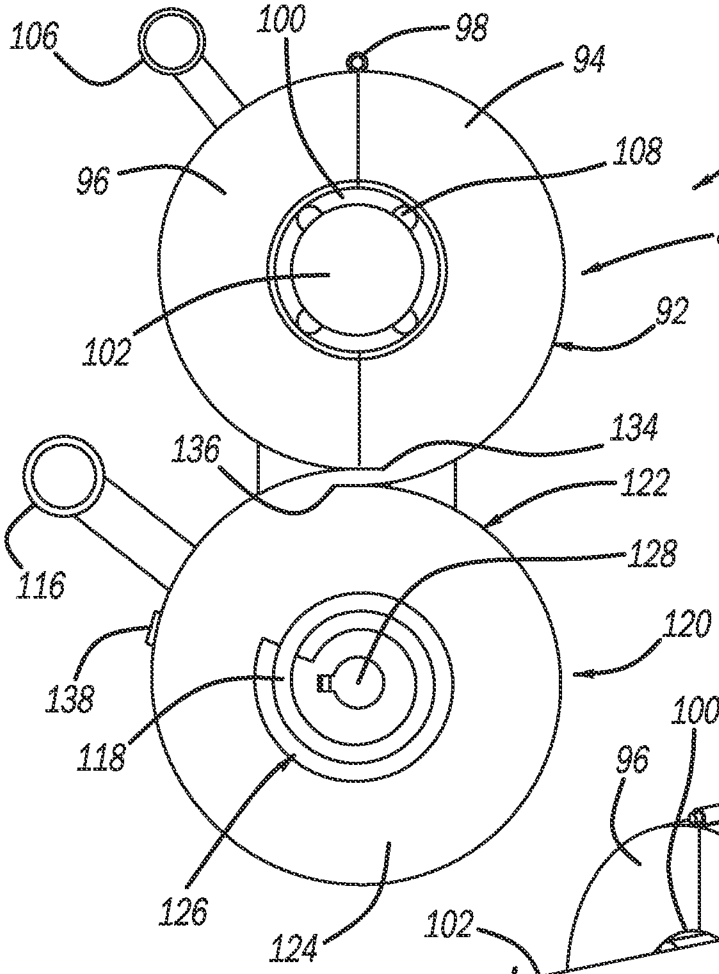
FIG. 5 is a front view of a current transformer assembly including a current transformer and a detachable magnetic tape cartridge.
Figure 6:
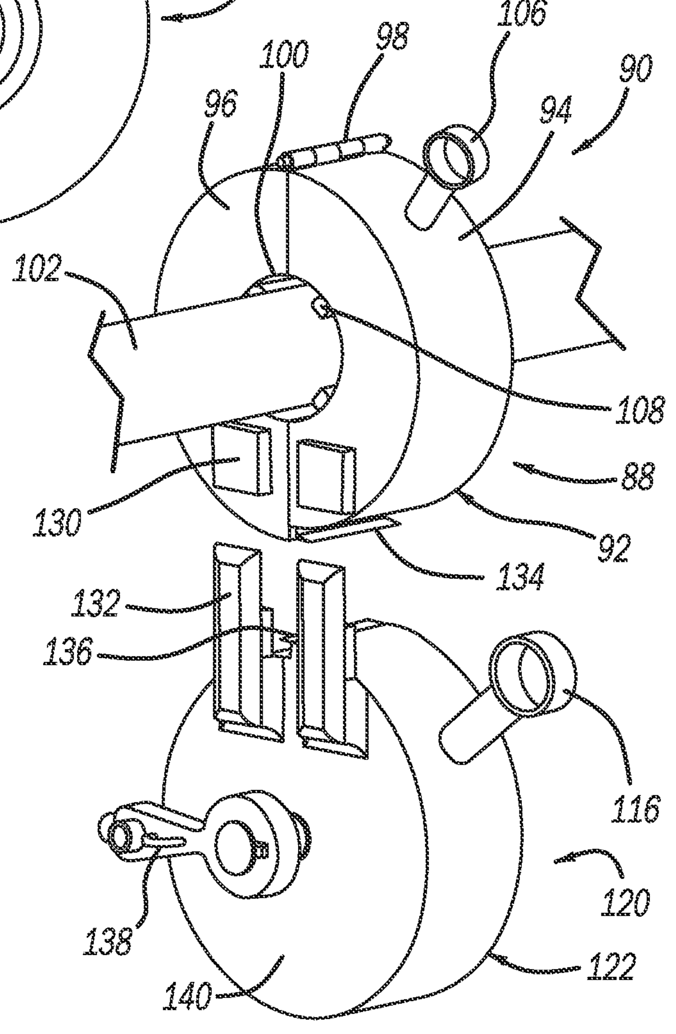
FIG. 6 is an exploded back isometric view of the current transformer assembly shown in FIG. 5.
Figure 7:
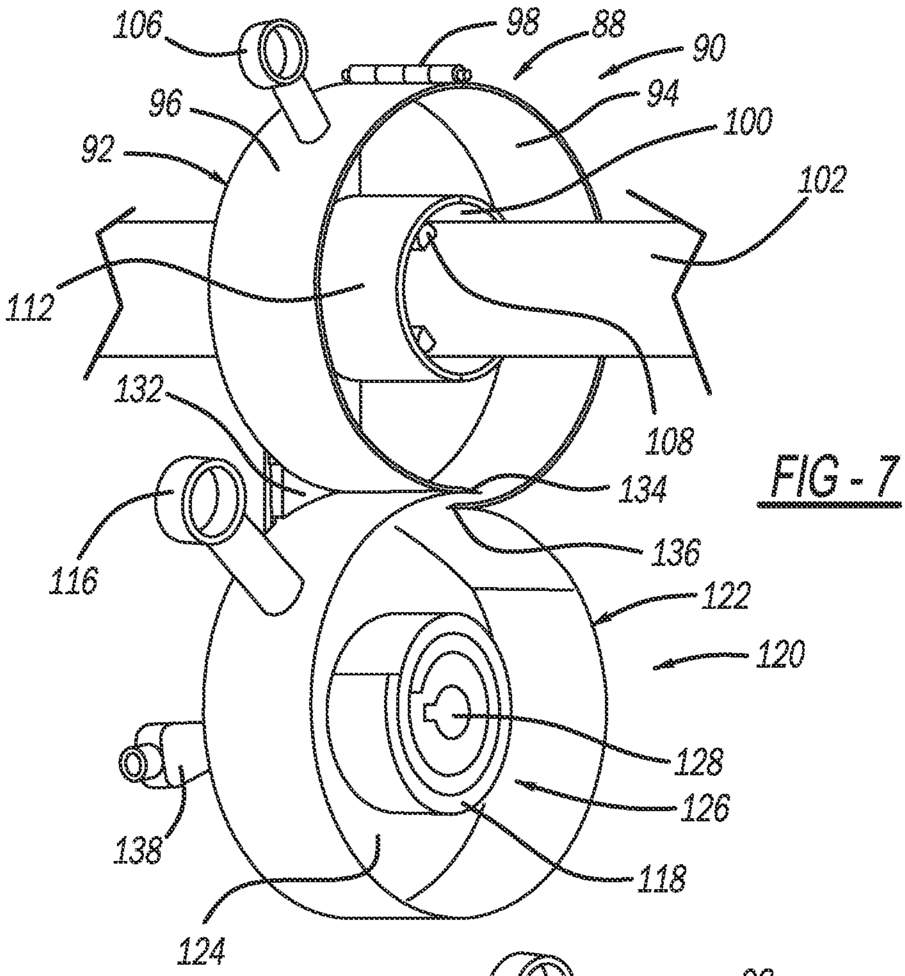
FIG. 7 is a front broken-away isometric view of the current transformer assembly shown in FIG. 5.
Figure 8:
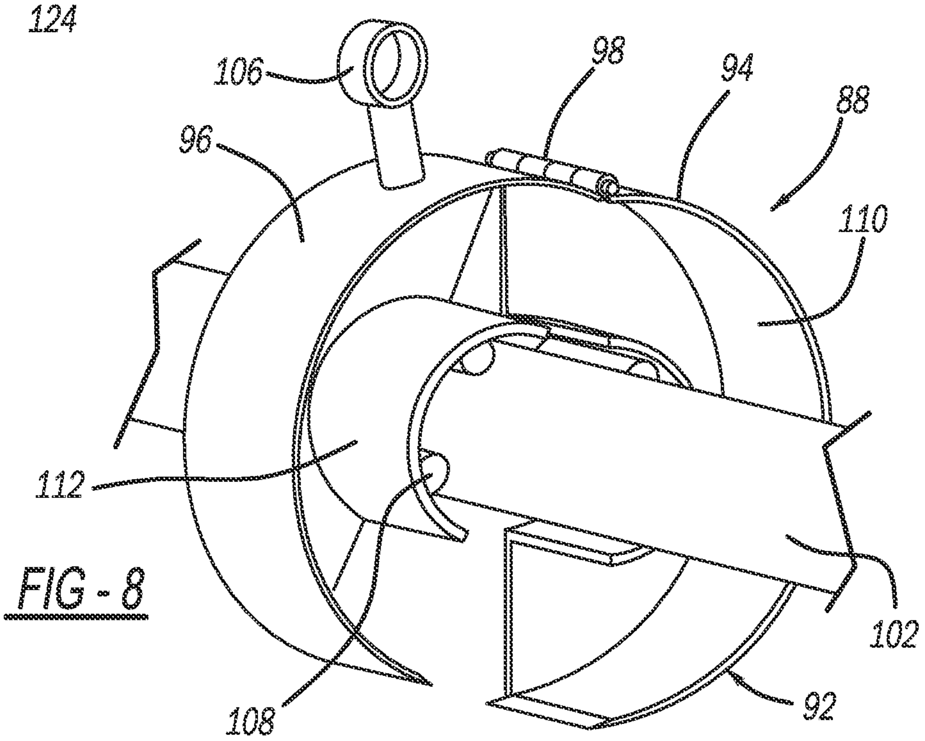
FIG. 8 is an isometric view of a current transformer in the current transformer assembly shown in FIG. 5 in an open configuration.

The current transformer assembly 10 includes one embodiment for how the spiral core can be deployed in a current transformer that can be mounted to a power line for harvesting power therefrom of the type being discussed herein. Other embodiments showing how the spiral core can be deployed also may be applicable. FIG. 5 is a front view, FIG. 6 is an exploded back isometric view and FIG. 7 is a front cut-away isometric view of a current transformer assembly 90 showing one such embodiment. The assembly 90 includes a current transformer 88 having a cylindrical housing 92 with a first housing half 94 and a second housing half 96 being pivotally mounted together by a torsional spring hinge 98 and defining a center opening 100 through which a power line 102 extends when the assembly 90 is in use. FIG. 8 is an isometric view of the housing 92 in its open state to show how the housing halves 94 and 96 separate on the hinge 98 to secure the housing 92 to the power line 102, where magnets (not shown) opposite to the hinge 98 can be employed to hold the housing halves 94 and 96 together and allow the halves 94 and 96 to be separated. A hook 106 is secured to and extends from the housing 92 to allow a lineman to remotely secure the assembly 90 to and remove the assembly 90 from the line 102. A series of friction rollers 108 are secured to the housing 92 so that they extend into the opening 100 and contact the power line 102 to prevent the assembly 90 from rotating on the line 102. The housing 92 includes a central chamber 110 that will accept a current transformer magnetic tape that is wound on a spindle 112 as will be discussed below.

Once the housing 92 is secured to the power line 102, the lineman will then attach a cylindrical tape cartridge 120 to the housing 92. The tape cartridge 120 includes a cartridge housing 122 defining a chamber 124 therein holding a tape winding 126 including a magnetic tape 118 wound on a rod 128 in the chamber 124 and a hook 116 that allows the lineman to hold the cartridge 120. In this embodiment, magnetic pads 130 are secured to the housing 92 and the cartridge 120 includes magnets 132, or another ferromagnetic material, extending from the housing 122 to allow the lineman to attach the cartridge 120 to the current transformer 88. In this configuration, a slot 134 in the housing 92 aligns with a slot 136 in the housing 122. A crank 138 extending from a back surface 140 of the housing 122 is attached to the rod 128 on which the winding 126 is wound so that rotation of the crank 138 in one direction causes the magnetic tape 118 to feed through the slots 134 and 136 so that the magnetic tape 118 is wound on the spindle 112 in the housing 92 and forms the core of the current transformer 88.

The cartridge 120 can remain attached to the housing 92 where an end of the magnetic tape 118 remains secured to the rod 128 so that the magnetic tape 118 can be wound back on the rod 128 by rotating the crank 138 in the opposite direction to remove the magnetic tape 118 from the housing 92. Alternately, the magnetic tape 118 can be completely wound in the housing 92 and the cartridge 120 removed therefrom, where the cartridge 120 can then be reloaded with another winding for installation on another current transformer.

Figure 9:
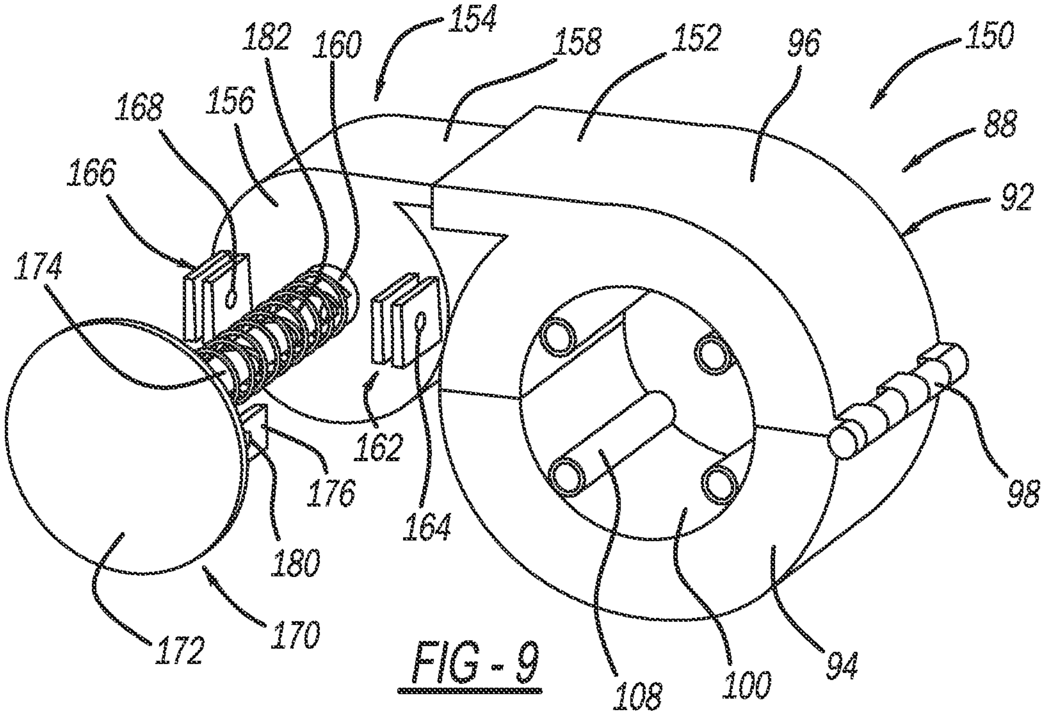
FIG. 9 is an isometric view of another current transformer assembly also including a current transformer and a detachable magnetic tape cartridge.
Figure 10:
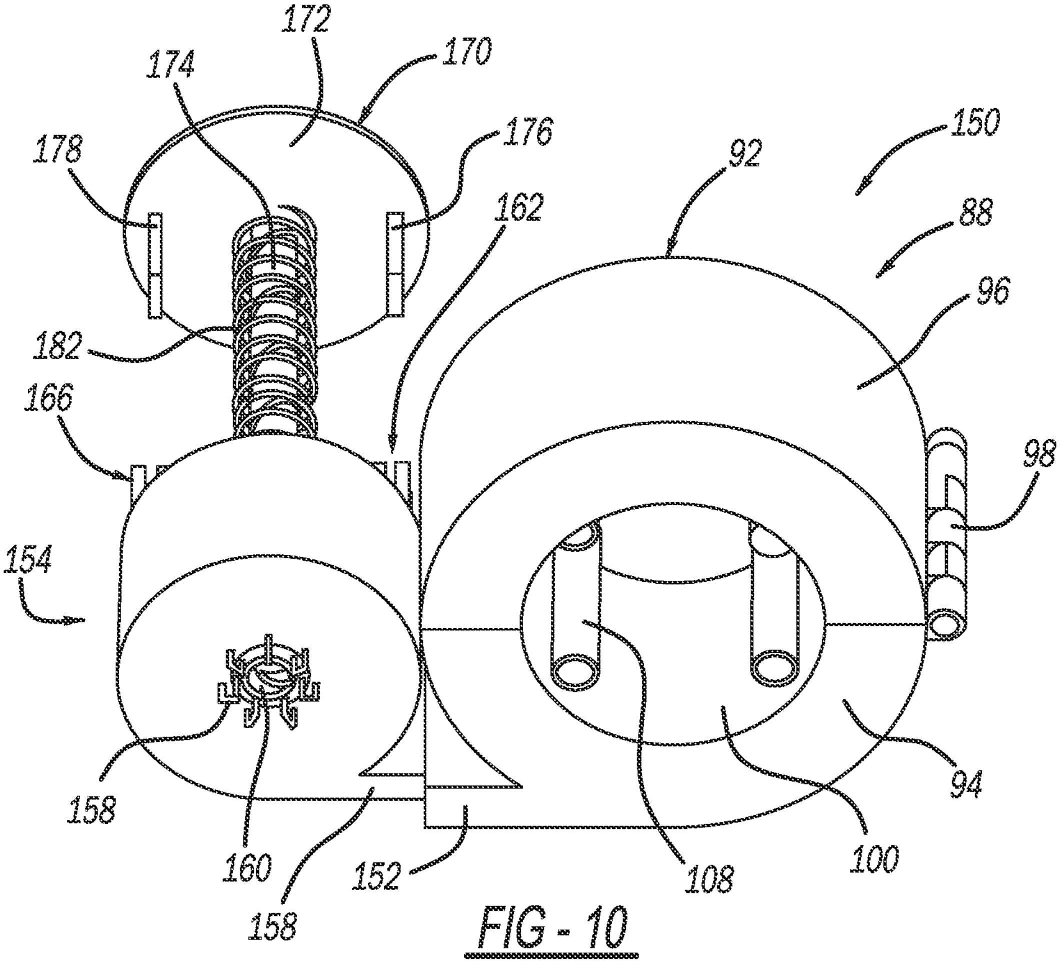
FIG. 10 is another isometric view of the current transformer assembly shown in FIG. 9.
Figure 11:
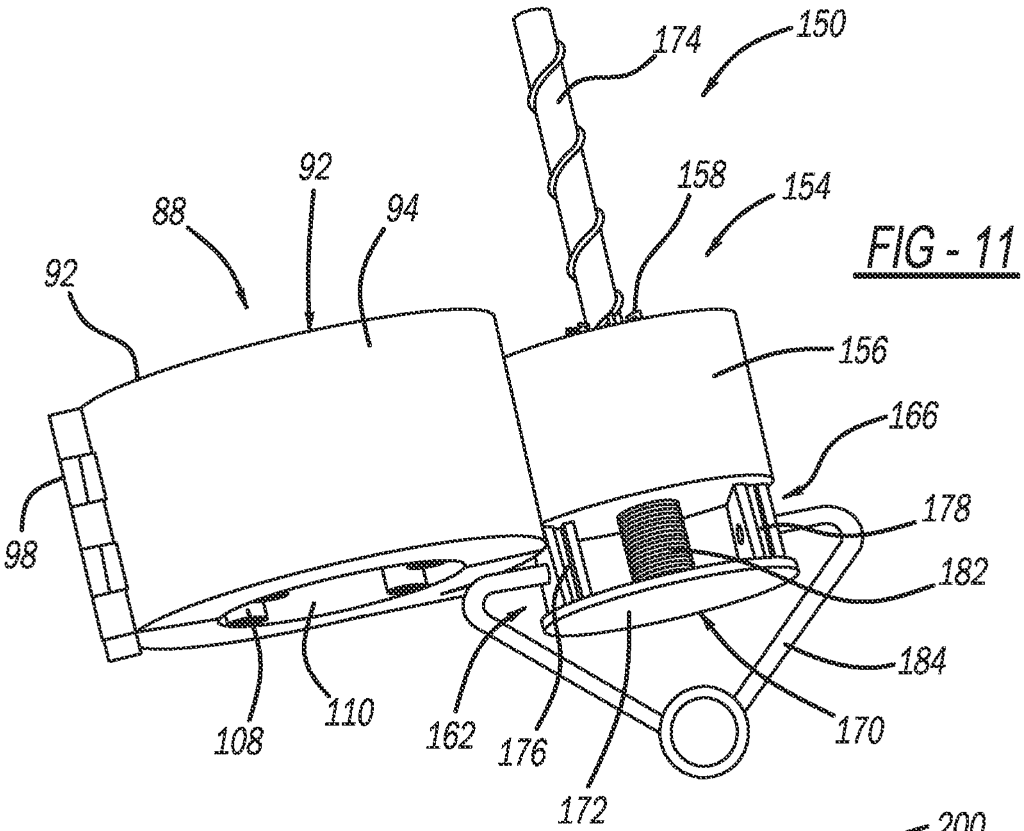
FIG. 11 is another isometric view of the current transformer assembly shown in FIG. 9.

FIGS. 9, 10 and 11 are isometric views of a current transformer assembly 150 that is similar to the assembly 90, where like elements are identified by the same reference number. In this embodiment, the slot 134 in the housing 92 is replaced with a duct 152 and the cartridge 120 is replaced with a cartridge 154 including an outer housing 156 having the magnetic tape 118 wound therein. The housing 156 includes a duct 158 that is inserted into the duct 152 that not only provides a transition location for the magnetic tape 118 from the cartridge 154 to the housing 92, but also allows the cartridge 154 to be secured to the housing 92, by, for example, magnetic coupling or press fit. The cartridge 154 includes a spring follower 160 extending therethrough and the housing 156 includes a pair of tabs 162 having aligned through holes 164 on one side of the spring follower 160 and a pair of tabs 166 having aligned through holes 168 on an opposite side of the spring follower 160. Alignment prongs 158 extend from the housing 156 around the spring follower 160.

The assembly 150 also includes a plunger 170 having a head 172 and a rod 174, where tabs 176 and 178 having holes 180 extend from an inside surface of the head 172 on opposite sides of the rod 174. A compression spring 182 is slid onto the rod 174 and the rod 174 is inserted into the spring follower 160 so that the spring 182 is compressed between the head 172 and the housing 156, as shown in FIG. 11. In this configuration, the tab 176 is positioned between the tabs 162 so that the holes 164 and 180 align and the tab 178 is positioned between the tabs 166 so that the holes 168 and 180 align. A compressible pull pin 184 is inserted into the holes 164, 168 and 180 to hold the spring 182 in compression and the magnetic tape 118 is loaded onto the spring follower 160 with spring tension. When the housing 92 is clasped onto the power line 102, the pin 184 is pulled by, for example, a hot stick, and the spring 182 is released, which pushes the rod 174 out of the spring follower 160 causing it to rotate, which causes the magnetic tape 118 to be unwound from the spring follower 160 and wound onto the spindle 112 within the housing 92.

Figure 12:
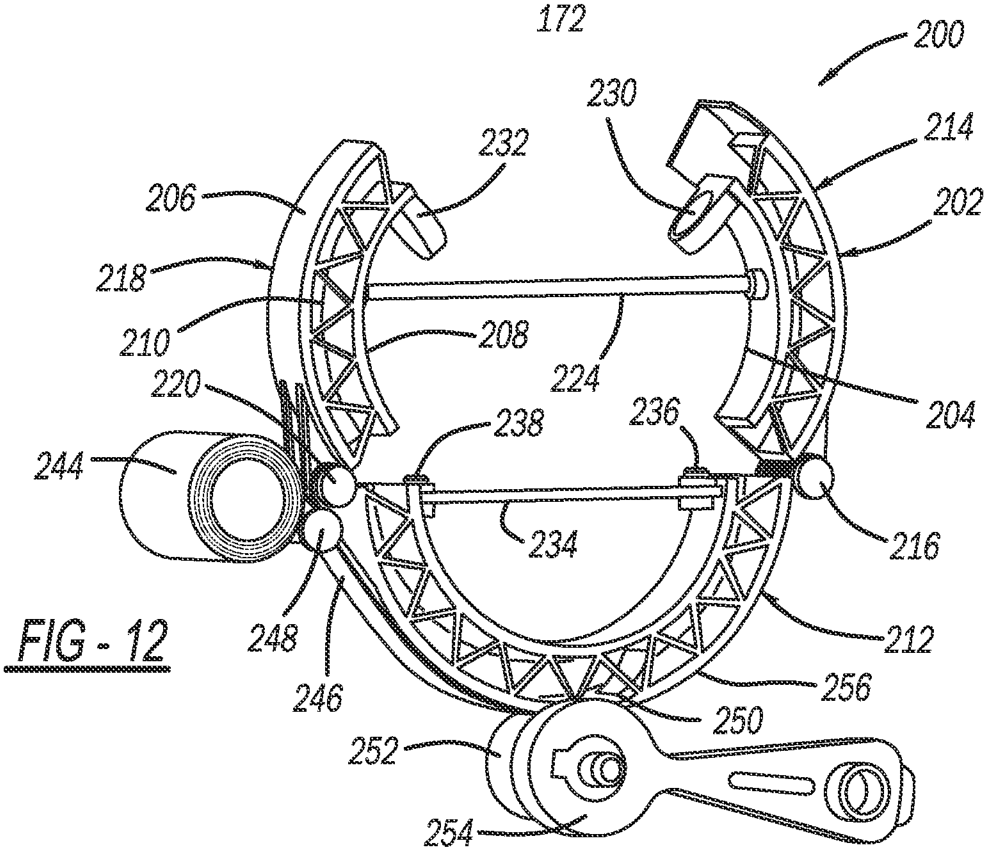
FIG. 12 is an isometric view of another current transformer assembly including a current transformer having a hinged outer structure.

FIG. 12 is an isometric view of a current transformer assembly 200 including an elliptical structure 202 defining a central opening 204. The structure 202 includes an outer elliptical rail 206 and an inner elliptical rail 208 defining a gap 210 therebetween. The structure 202 is formed by a lower section 212, a first side section 214 secured to the lower section 212 by a spring-loaded hinge 216 and a second side section 218 secured to the lower section 212 by a spring-loaded hinge 220. The assembly 200 includes a snap rod 224 extending across the opening 204 to hold the structure 202 in the open position against the bias of the spring-loaded hinges 216 and 220. When the rod 224 is removed the hinges 216 and 220 force the structure 202 closed so that a magnetic tab 230 on the first side section 214 is magnetically coupled to a magnetic tab 232 on the second side section 218 and the structure 202 is held closed. The assembly 200 further includes a frictional elastic band 234 coupled to band fasteners 236 and 238 secured to the lower section 212 so that the band 234 extends across the opening 204. The assembly 200 also includes a roll 244 of current transformer magnetic tape 246 mounted to a tape carrier 248 secured to an outer surface 256 of the outer rail 206, where the magnetic tape 246 is directed along the surface 256, through a slot 250 in the outer rail 206 and into the gap 210, as shown. A friction roller 252 is positioned in contact with the magnetic tape 246 and is rotated by a roller crank 254.

Figure 13:
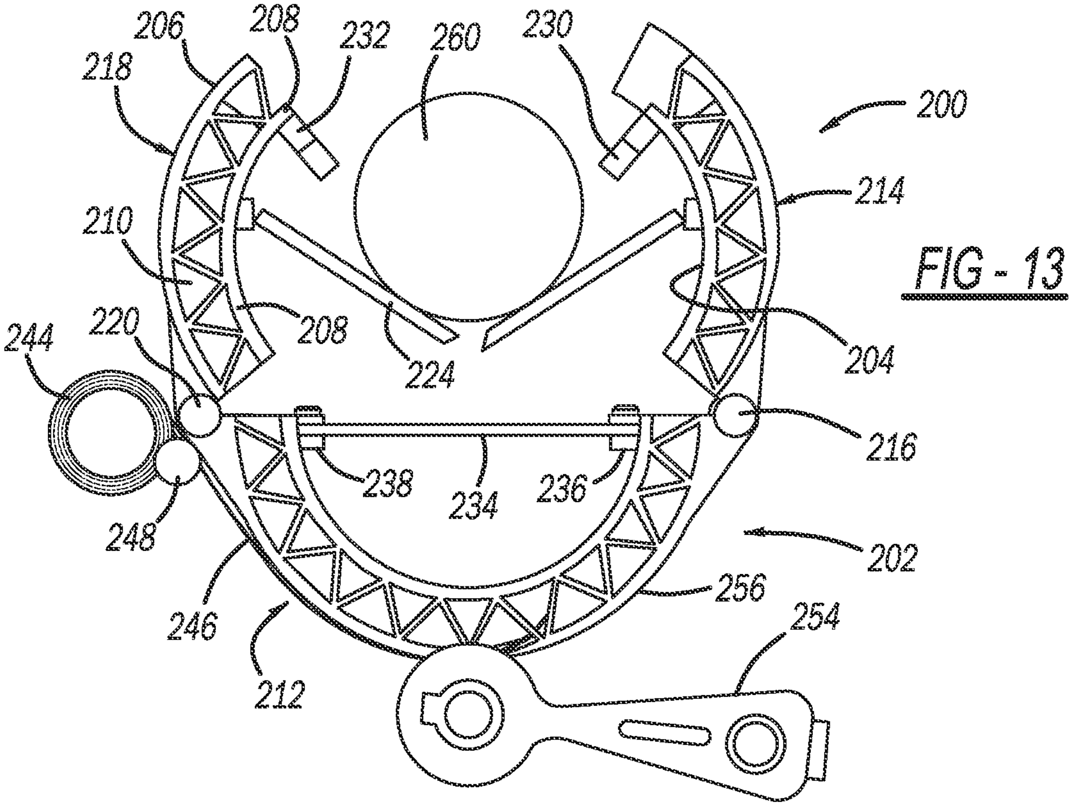
FIG. 13 is a front view of the current transformer assembly shown in FIG. 12 with the structure open and a power line extending therethrough.
Figure 14:
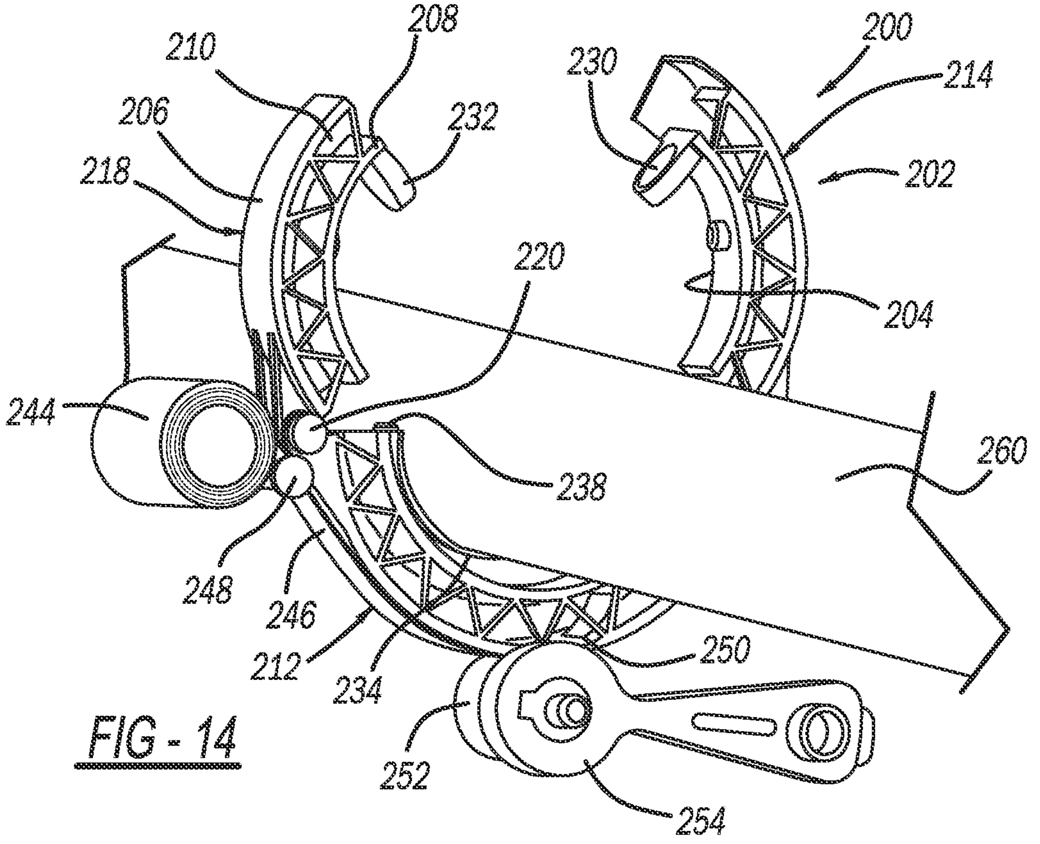
FIG. 14 is an isometric view of the current transformer assembly shown in FIG. 12 with the structure open and the power line extending therethrough.
Figure 15:
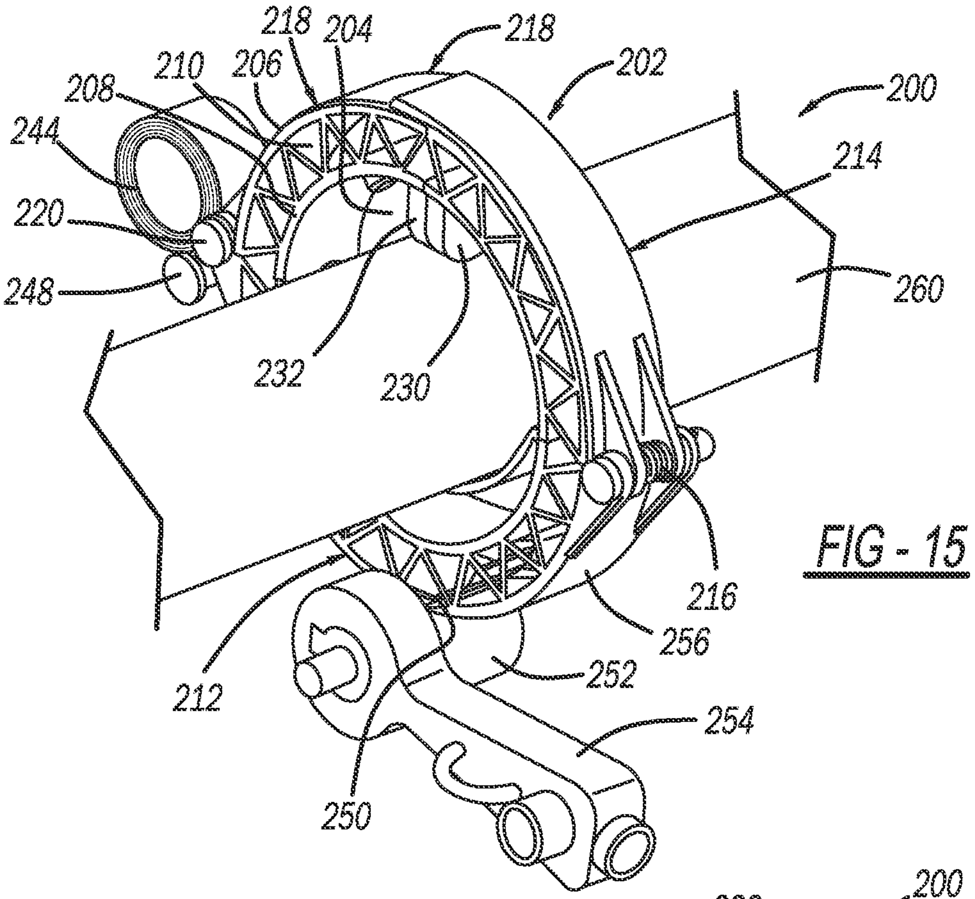
FIG. 15 is an isometric view of the current transformer assembly shown in FIG. 12 with the structure closed and the power line extending therethrough.
Figure 16:
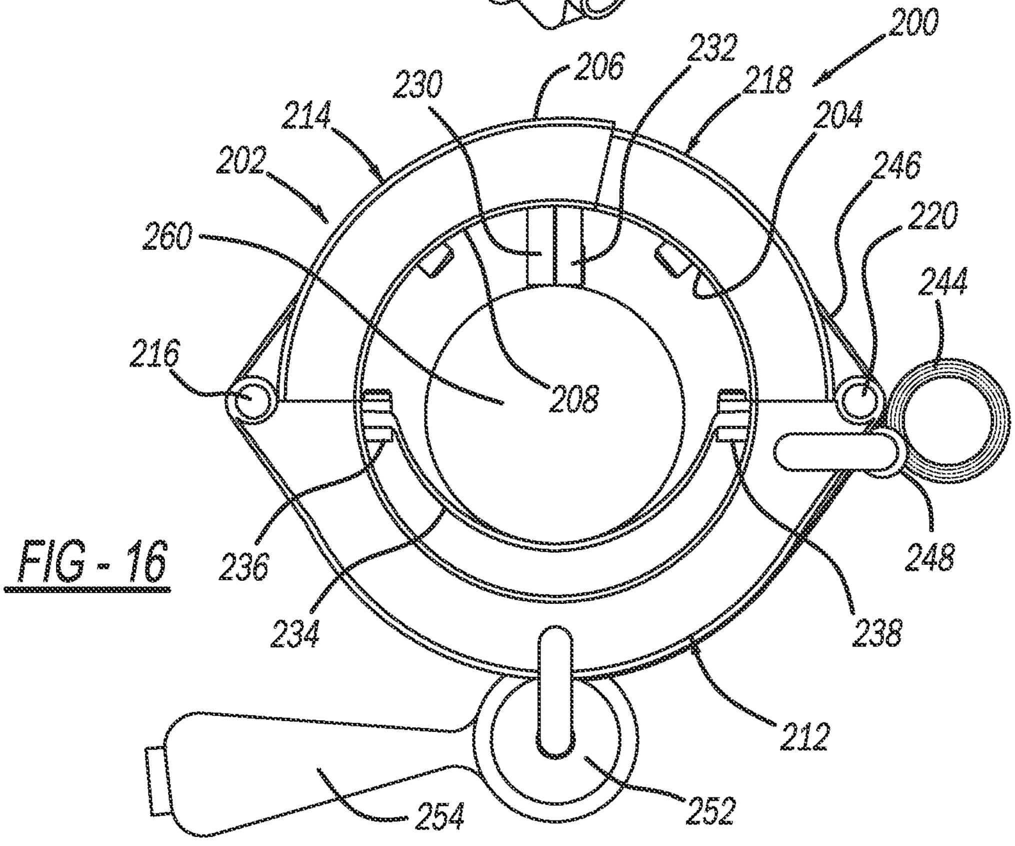
FIG. 16 is a back view of the current transformer assembly shown in FIG. 12 with the structure closed and the power line extending therethrough.

The current transformer assembly 200 is secured to a power line 260 as follows. The assembly 200 is positioned by, for example, a hot stick or otherwise, so that the power line 260 is inserted between the sections 214 and 218 and into the opening 204 so that it snaps the rod 224, as shown in FIG. 13. The power line 260 then contacts the band 234 pushing it downward, as shown in FIG. 14. At the same time, removal of the rod 224 allows the spring-loaded hinges 216 and 220 to close the structure 202 so that the magnetic tabs 230 and 232 engage and hold the structure 202 closed, where the power line 260 is securely held between the band 234 and the tabs 230 and 232, as shown in FIGS. 15 and 16. The crank 254 is then rotated by the hot stick or otherwise so that that friction roller 252 pulls the magnetic tape 246 around the carrier 244 so that it is fed through the slot 250 in the outer rail 206 and into and around the gap 210 to surround the power line 260 as a transformer core.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A current transformer assembly for harvesting power from a primary conductor, the current transformer assembly comprising;

a current transformer including a transformer structure having a central opening that accepts the primary conductor and a spindle member for accepting a current transformer magnetic tape or lamination operating as a core of the current transformer;

a tape carrier secured to the transformer structure on which the current transformer magnetic tape is wound;

a winding device operable to unwind the current transformer magnetic tape from the tape carrier and wind the current transformer magnetic tape onto the spindle member, wherein the structure is an elliptical structure that includes an inner rail and an outer rail defining a gap therebetween that accepts the current transformer magnetic tape and operates as the spindle member, the transformer structure being separated into a lower section, a first side section being coupled to one side of the lower section by a first spring-loaded hinge and a second side section being coupled to another side of the lower section by a second spring-loaded hinge; and a snap rod extending across the central opening and being positioned between the first and second side sections against a bias of the first and second spring-loaded hinges and an elastic band extending across the central opening and being coupled at both ends to the lower section, the first side section including a first magnetic tab opposite to the first spring-loaded hinge and the second side section including a second magnetic tab opposite to the second spring-loaded hinge, wherein the primary conductor is inserted into the central opening between the first and second magnetic tabs in a manner that breaks the snap rod and engages the elastic band so that the first and second spring-loaded hinges close the transformer structure causing the first and second magnetic tabs to engage each other so that the primary conductor is positioned between the first and second magnetic tabs and the elastic band.

2. A current transformer assembly for harvesting power from a primary conductor, the current transformer assembly comprising;

a current transformer including a transformer structure having a central opening that accepts the primary conductor and a spindle member for accepting a current transformer magnetic tape or lamination operating as a core of the current transformer;

a tape carrier secured to the transformer structure on which the current transformer magnetic tape is wound; and a winding device operable to unwind the current transformer magnetic tape from the tape carrier and wind the current transformer magnetic tape onto the spindle member, wherein the transformer structure is an elliptical structure that includes an inner rail and an outer rail defining a gap therebetween that accepts the current transformer magnetic tape and operates as the spindle member, the transformer structure being separated into a lower section, a first side section being coupled to one side of the lower section by a first spring-loaded hinge and a second side section being coupled to another side of the lower section by a second spring-loaded hinge;

wherein the tape carrier is mounted to the outer rail and the current transformer magnetic tape extends through a slot in the outer rail, the winding device including a crank having a friction roller mounted thereto that engages the current transformer magnetic tape, the crank being operable to rotate the friction roller causing the current transformer magnetic tape to move through the slot and wind in the gap.

* * * * *